United States Patent
Brandl

(10) Patent No.: US 11,947,034 B2
(45) Date of Patent: Apr. 2, 2024

(54) IN-SITU PHASE CALIBRATION FOR RADAR SYSTEM

(71) Applicant: Infineon Technologies AG, Neubiberg (DE)

(72) Inventor: Matthias Brandl, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 268 days.

(21) Appl. No.: 17/478,382

(22) Filed: Sep. 17, 2021

(65) Prior Publication Data

US 2023/0093334 A1     Mar. 23, 2023

(51) Int. Cl.
    *G01S 7/40*      (2006.01)

(52) U.S. Cl.
    CPC .......... *G01S 7/4056* (2013.01); *G01S 7/4021* (2013.01)

(58) Field of Classification Search
    CPC .............................................. G01S 7/40–4095
    See application file for complete search history.

(56) References Cited

U.S. PATENT DOCUMENTS

| | | | |
|---|---|---|---|
| 3,427,615 A | 2/1969 | Hubka | |
| 10,422,856 B2* | 9/2019 | Cheung | G01S 7/352 |
| 11,150,294 B2 | 10/2021 | Maiellaro et al. | |
| 11,231,484 B2 | 1/2022 | Subburaj et al. | |
| 11,431,375 B2 | 8/2022 | Savary et al. | |
| 2020/0174098 A1 | 6/2020 | Lang et al. | |
| 2020/0287587 A1* | 9/2020 | Cheung | G01S 7/02 |
| 2020/0382170 A1* | 12/2020 | Lang | H03M 1/12 |
| 2021/0025973 A1* | 1/2021 | Fiore | G01S 13/325 |
| 2021/0072346 A1 | 3/2021 | Bogner et al. | |
| 2021/0156983 A1* | 5/2021 | Kraut | G01S 7/4008 |
| 2022/0026527 A1* | 1/2022 | Kulmer | G01S 7/4017 |
| 2022/0196796 A1* | 6/2022 | Fiore | G01S 7/4021 |
| 2022/0334218 A1* | 10/2022 | Kulmer | G01S 7/40 |

FOREIGN PATENT DOCUMENTS

| | | |
|---|---|---|
| EP | 3343243 A1 | 7/2018 |
| EP | 3356849 B1 | 11/2019 |
| EP | 3667358 A1 | 6/2020 |

* cited by examiner

*Primary Examiner* — Matthew M Barker
(74) *Attorney, Agent, or Firm* — Slater Matsil, LLP

(57) ABSTRACT

A method for calibrating a receiving (Rx) channel of a frequency-modulated continuous-wave (FMCW) radar system includes: setting the Rx channel in calibration mode, where the Rx channel includes a mixer, a phase shifter coupled to a first input of the mixer, a filter coupled to an output of the mixer, and an analog-to-digital converter (ADC) coupled to an output of the filter; setting a value for a phase shifter control word of the phase shifter; sending a chirp signal to the phase shifter; sending a modulated chirp signal to a second input of the mixer, where an output signal at the output of the mixer includes a beat signal; and forming an amplitude curve based on data samples from the ADC, where the amplitude curve illustrates amplitudes of the beat signal at a plurality of frequencies within an operating frequency band of the FMCW radar system.

20 Claims, 16 Drawing Sheets

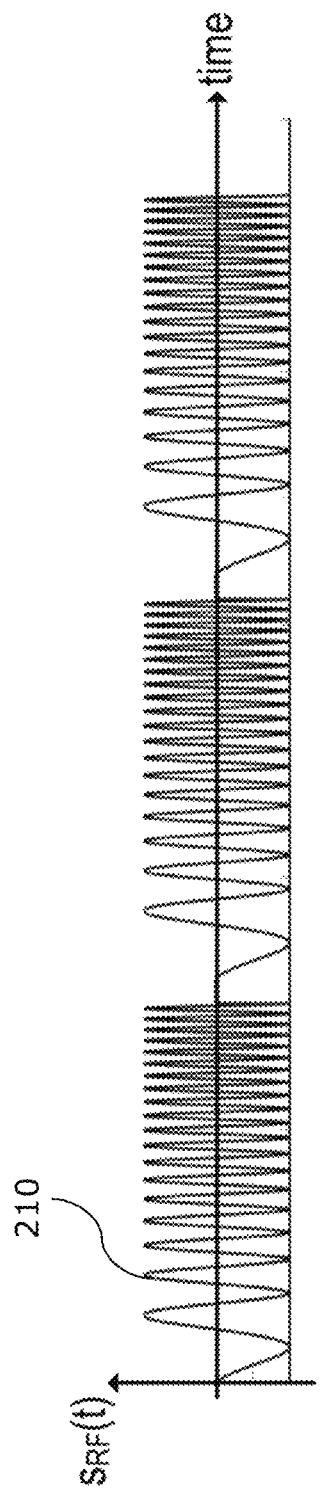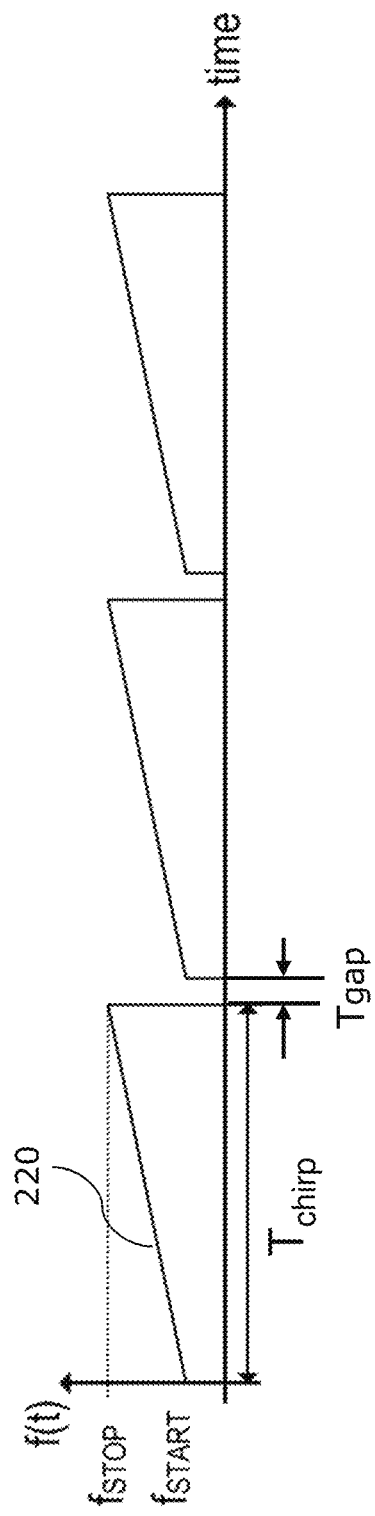

1000 performing a first measurement of the Rx channel by: — 1010
  sending a chirp signal through a first signal path to a first input terminal of a mixer of the Rx channel, wherein the first signal path comprises a modulation circuit that modulates the chirp signal with a modulating signal to generate a modulated chirp signal;
  sending the chirp signal through a second signal path to a second input terminal of the mixer, wherein the second signal path comprises a phase shifter that introduces a phase shift to the chirp signal in accordance with a phase shifter control word of the phase shifter, wherein the phase shifter control word has a first value for the first measurement;
  filtering an output signal of the mixer using a filter;
  sampling an output signal of the filter to generate digital samples using an analog-to-digital converter (ADC), wherein the output signal of the filter comprises a modulated beat signal that is a beat signal modulated by the modulating signal; and
  determining a first curve using the digital samples, wherein the first curve illustrates amplitudes of the modulated beat signal at a plurality of frequencies within a frequency band of the chirp signal when the phase shifter control word has the first value performing a second measurement of the Rx channel and determining a second curve that illustrates the amplitudes of the modulated beat signal at the plurality of frequencies when the phase shifter control word has a second value, wherein the second measurement is performed using a same method as the first measurement but with the phase shifter control word having the second value — 1020 for each frequency of the plurality of frequencies, generating a phase response curve using at least the amplitudes of the modulated beat signal in the first curve and the second curve that correspond to the each frequency, wherein the phase response curve illustrates phases of the Rx channel for different values of the phase shifter control word — 1030

Fig. 16

IN-SITU PHASE CALIBRATION FOR RADAR SYSTEM

TECHNICAL FIELD

The present invention relates generally to systems and methods for phase response calibration for a radar system with multiple receiving channels.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at, e.g., 60 GHz, 77 GHz, and 80 GHz, or even beyond 100 GHz. Such applications include, for example, automotive radar systems and multi-gigabit communication systems.

Radar is used for different applications such as target identification/tracking, positioning, monitoring of physical conditions, or motion/gesture sensing. Radar systems using radio frequency integrated circuits (RFICs) have been widely deployed in autonomous driving vehicles. The ability to easily characterize the frequency responses of the RFICs may improve system performance, e.g., by allowing monitoring and compensation of the frequency characteristics of the RFICs, either at the manufacturing facility or in the field. Conventional calibration methods for RFICs may be costly and timing consuming, and may not be applicable for devices already deployed in the field. There is a need in the art for easy, accurate, and cost-effective calibration methods for RFICs.

SUMMARY

In accordance with an embodiment, a method of calibrating a receiving (Rx) channel of a frequency-modulated continuous-wave (FMCW) radar system includes: performing a first measurement of the Rx channel by: sending a chirp signal through a first signal path to a first input terminal of a mixer of the Rx channel, wherein the first signal path comprises a modulation circuit that modulates the chirp signal with a modulating signal to generate a modulated chirp signal; sending the chirp signal through a second signal path to a second input terminal of the mixer, wherein the second signal path comprises a phase shifter that introduces a phase shift to the chirp signal in accordance with a phase shifter control word of the phase shifter, wherein the phase shifter control word has a first value for the first measurement; filtering an output signal of the mixer using a filter; sampling an output signal of the filter to generate digital samples using an analog-to-digital converter (ADC), wherein the output signal of the filter comprises a modulated beat signal that is a beat signal modulated by the modulating signal; and determining a first curve using the digital samples, wherein the first curve illustrates amplitudes of the modulated beat signal at a plurality of frequencies within a frequency band of the chirp signal when the phase shifter control word has the first value. The method further includes performing a second measurement of the Rx channel and determining a second curve that illustrates the amplitudes of the modulated beat signal at the plurality of frequencies when the phase shifter control word has a second value, wherein the second measurement is performed using a same method as the first measurement but with the phase shifter control word having the second value; and for each frequency of the plurality of frequencies, generating a phase response curve using at least the amplitudes of the modulated beat signal in the first curve and the second curve that correspond to the each frequency, wherein the phase response curve illustrates phases of the Rx channel for different values of the phase shifter control word.

In accordance with an embodiment, a method of operating a frequency-modulated continuous-wave (FMCW) radar system having multiple receiving (Rx) channels includes calibrating the FMCW radar system, wherein calibrating the FWCM radar system comprises: setting the Rx channels in a calibration mode, wherein each of the Rx channels includes a mixer, a programmable phase shifter coupled to a first input terminal of the mixer, a filter coupled to an output terminal of the mixer, and an analog-to-digital converter (ADC) coupled to an output terminal of the filter; and sweeping a value of a phase shifter control word of the programmable phase shifter in each of the Rx channels across a range of values, wherein the value of the phase shifter control word sets a phase shift in the programmable phase shifter, wherein the sweeping comprises, for each of the Rx channels: setting a value for the phase shifter control word of the programmable phase shifter; sending a chirp signal to the programmable phase shifter; sending a modulated chirp signal to a second input terminal of the mixer, wherein an output signal at the output terminal of the mixer comprises a beat signal; and for each of the range of values of the phase shifter control word, forming an amplitude curve based on data samples from the ADC in the Rx channel, wherein the amplitude curve illustrates amplitudes of the beat signal at a plurality of frequencies within an operating frequency band of the FMCW radar system. Calibrating the FMCW radar system further comprises, after forming the amplitude curve, for each of the Rx channels and for each frequency of the plurality of frequencies, performing a curve fitting to generate a phase response curve using the amplitudes of the beat signal at the range of values of the phase shifter control word, wherein the phase response curve illustrates phases of the Rx channel for the range of values of the phase shifter control word.

In accordance with an embodiment, a frequency-modulated continuous-wave (FMCW) radar system includes: a plurality of receiving (Rx) channels, wherein each of the Rx channels comprises a mixer, a programmable phase shifter coupled to a first input terminal of the mixer, an filter coupled to an output terminal of the mixer, and an analog-to-digital converter (ADC) coupled to an output terminal of the filter; and a control logic coupled to the ADCs in the Rx channels, wherein the control logic is configured to calibrate each of the Rx channels by: setting the Rx channel in a calibration mode; generating a plurality of amplitude curves for the Rx channel, wherein each of the plurality of amplitude curves is generated by: setting a phase shifter control word of the programmable phase shifter in the Rx channel to a different value; sending a chirp signal to an input terminal of the programmable phase shifter; sending a modulated chirp signal to a second input terminal of the mixer, wherein an output signal at the output terminal of the mixer comprises a beat signal; and computing, using data samples from the ADC in the Rx channel, amplitudes of the beat signal at a plurality of frequencies within an operating frequency band of the FMCW radar system; and after generating the plurality of amplitude curves, for each of the Rx channels and for each frequency of the plurality of frequencies, performing a sine wave curve fitting to generate a phase response curve using the amplitudes of the beat signals at the different values of the phase shifter control word, wherein the phase response curve illustrates phases of the Rx channel at different values of the phase shifter control word.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2A and 2B illustrate a transmitted RF signal of an FMCW radar system in time domain and frequency domain, respectively, in an embodiment;

FIG. 16 illustrates a flow chart of a method for calibrating a receiving channel of an FWCM radar system, in some embodiments.

DETAILED DESCRIPTION OF ILLUSTRATIVE EXAMPLES

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar numerals in different figures refer to the same or similar component.

The present disclosure will be described with respect to examples in a specific context, namely phase response characterization for FMCW radar systems with multiple parallel receiving channels.

Figure 1:
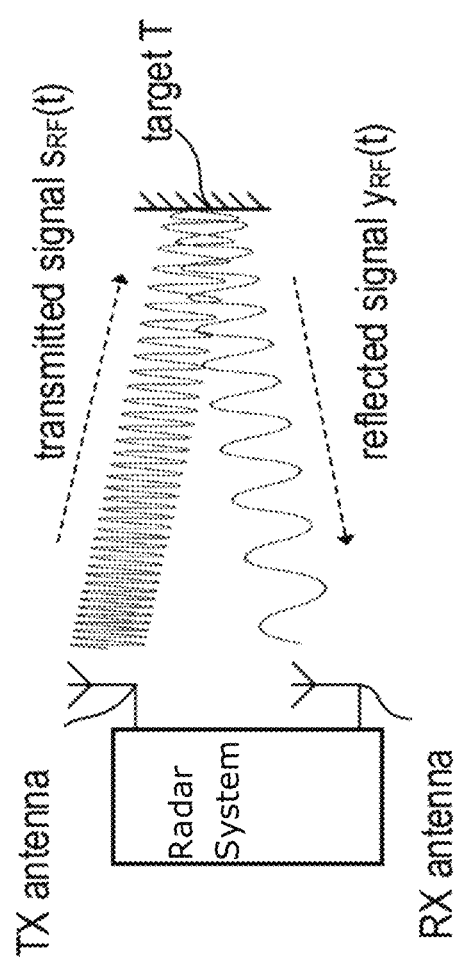
FIG. 1 illustrates a block diagram of a radar system, in an embodiment.

FIG. 1 illustrates the working principle of a frequency-modulated continuous-wave (FMCW) radar system, in an example. In the example of FIG. 1, the FMCW radar system transmits a radio frequency (RF) signal, which is a frequency-modulated continuous-wave signal, using one or more transmitting (Tx) antennas. The transmitted RF signal bounces back from a target, and is received by the FMCW radar system using one or more receiving (Rx) antennas. In FMCW radar systems, the frequency difference between the received RF signal and the transmitted RF signal increases proportionally with the time delay between the transmitted and received RF signals. Therefore, the distance between the FMCW radar system and the target can be determined by finding the frequency difference between the transmitted and received RF signals.

FIGS. 2A and 2B illustrate a transmitted RF signal of the FMCW radar system in time domain and frequency domain, respectively, in an example. As illustrated in FIGS. 2A and 2B, the transmitted RF signal includes a plurality of frames, where each frame has a duration of $T_{chirp}$ (also referred to as a chirp period, or a chirp duration). Each frame of the RF signal is a frequency ramp signal, with the frequency of the RF signal changes (e.g., increases or decreases) linearly within the frame from a first frequency (e.g., $f_{START}$) to a second frequency (e.g., $f_{STOP}$), as illustrated by curve 220 in FIG. 2B. The corresponding time domain signal is a continuous wave signal with its frequency changing over time, as illustrated by curve 210 in FIG. 2A. The transmitted RF signal within each frame is also referred to as a chirp signal. Each chirp signal has a corresponding frequency band covering frequencies from $f_{START}$ to $f_{STOP}$. In the example of FIGS. 2A and 2B, there are gaps $T_{gap}$ between adjacent frames, and no RF signal is transmitted in the gaps between adjacent frames. The RF signal illustrated in FIGS. 2A and 2B is for illustration purpose only and not limiting. Other suitable types of RF signals may also be used for the FMCW radar system.

Figure 3:
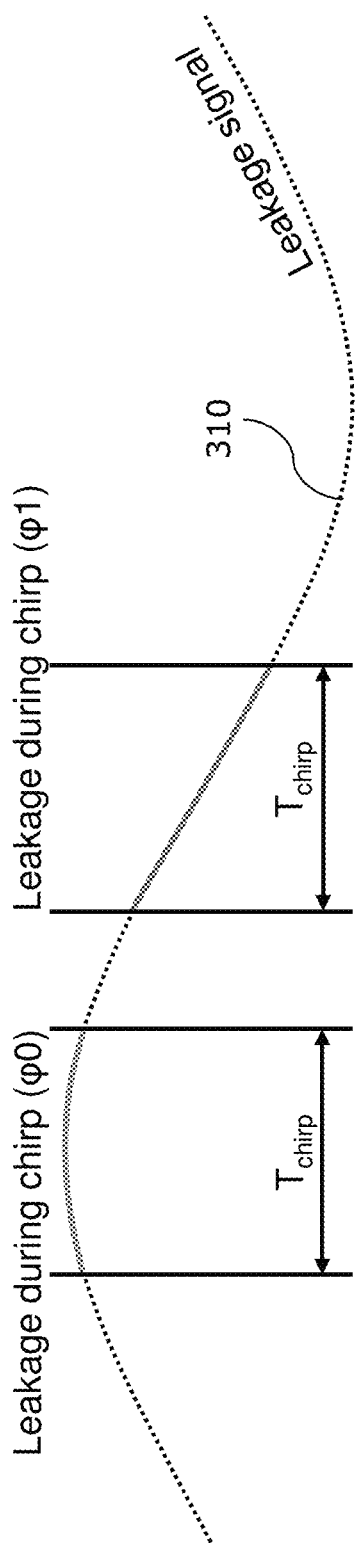
FIG. 3 illustrates sampling of a leakage signal in a radar receiver, in an embodiment.

FIG. 3 illustrates sampling of a leakage signal (310) in a radar receiver, in an embodiment. In radar systems, the received radar signal may include signal components corresponding the RF signal (e.g., a chirp signal) reflected by target(s) in the distance, and may also include signal components corresponding to reflected RF signal due to internal reflection (e.g., reflection within the radar receiver). The internally reflected RF signal typically is the strongest reflected signal, and produces a strong beat signal at the output of the mixer in the radar receiver. The beat signal (e.g., a sinusoidal signal) caused by the internal reflection is also referred to as a leakage signal. The leakage signal may dominate the received radar signal, thus limiting the amount of amplification (e.g., the gain in the intermediate frequency (IF) stage) on the receiving side, in order to not clipping the received signal. Since a higher amplification in the IF stage yields better signal-to-noise (SNR), in order to maximize the SNR, it may be advantageous to minimize the peak-to-peak value of the leakage signal in the recorded radar data (e.g., digital samples from an analog-to-digital converter (ADC) in the radar receiver), in some embodiments.

FIG. 3 shows a leakage signal, which is a sinusoidal signal. FIG. 3 further illustrates two chirp periods $T_{chirp}$. It is seen that the portion of the leakage signal in the first chirp period corresponds to a phase $\varphi_0$ of the leakage signal and has a smaller peak-to-peak value. In contrast, the portion of the leakage signal in the second chirp period corresponds to a phase $\varphi_1$ of the leakage signal and has a larger peak-to-peak value. It the example of FIG. 3, sampling of the received radar signal should be performed in the first chirp period with phase $\varphi_0$, since a larger IF gain can be applied to increase the SNR in the digital samples. Skilled artisans will readily appreciate that if the leakage signal is represented as a sine wave, then sampling should be performed around, e.g., phase $\pi/2$ of the sine wave, because the gradient (e.g., slope) of the sine wave is the smallest (e.g., zero) at phase $\pi/2$.

In some embodiments, in order to maximize the SNR of the input signal to the ADC, it may be advantageous to set the phase of the receiving (Rx) channel to a specific value, which may or may not correspond to a phase setting for minimal peak-to-peak value of the ADC samples. Therefore, in order to maximize the SNR, the radar receiver may employ a phase shifter in each of the Rx channels. The phase shifter may be used to, e.g., adjust (e.g., shift) the phase of the leakage signal, such that the sampling time is around (e.g., centered around) phase $\pi/2$ of the leakage signal (e.g., a sine wave). However, due to production variations, the frequency responses of the various components in the Rx channel are unknown, which means that the phase of the leakage signal is unknown and needs to be determined by a calibration process. The calibration process may be performed during manufacturing as an end-of-line calibration. However, the end-of-line calibration is expensive (e.g., slow) and is a one-time calibration process. The end-of-line calibration would not be able to compensate for changes in the phase response of the components due to, e.g., temperature change, component aging, or antenna detuning due to mechanical shift. In addition, the actual phase shift introduced by the phase shifter may deviate from its nominal value. An in-situ calibration process, which may be performed in the field periodically, or whenever needed, would overcome the above challenges and significantly improve the performance of the radar system. The present disclosure discloses systems and methods for in-situ calibration of the radar system.

Figure 4:
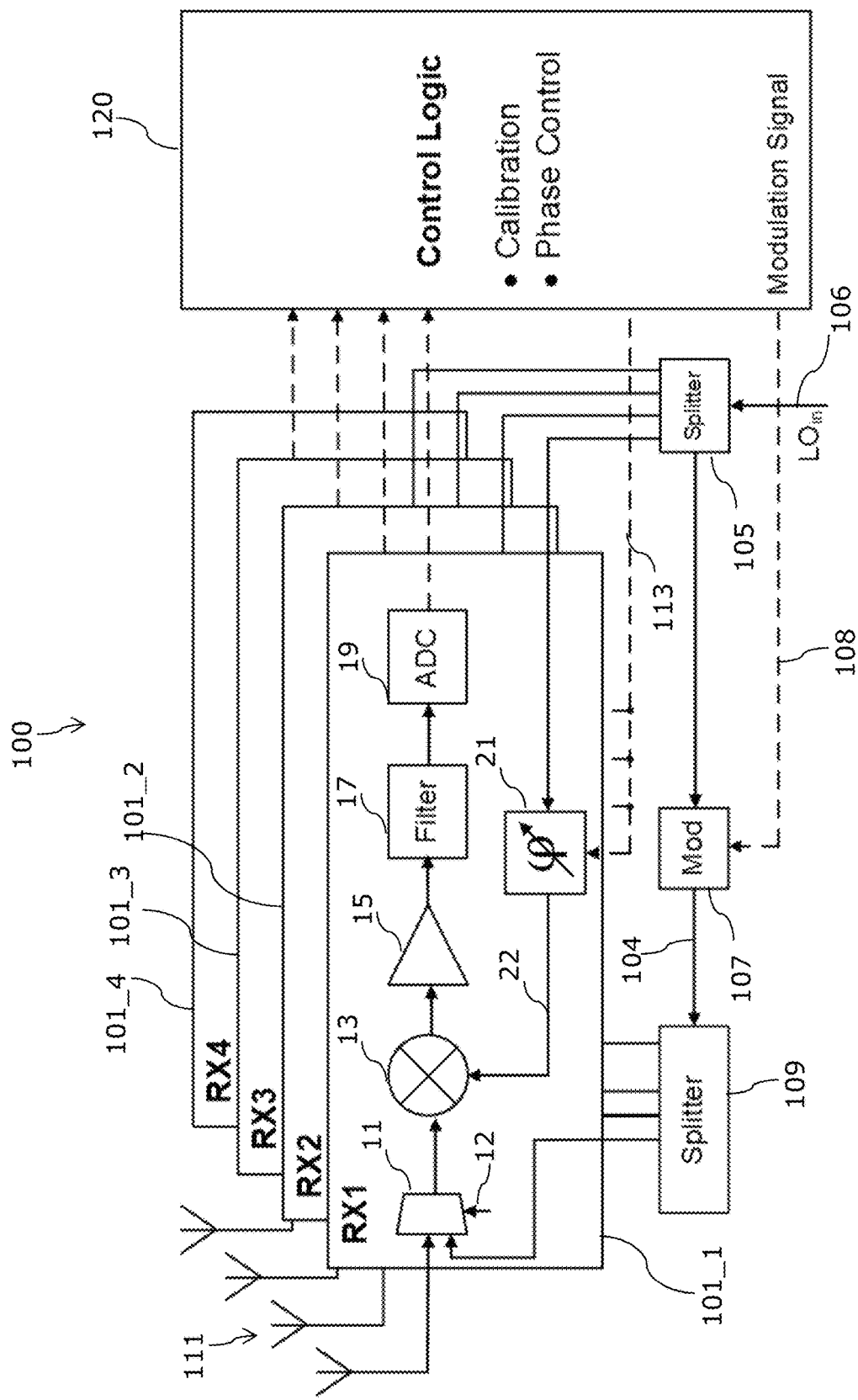
FIG. 4 illustrates a block diagram of a frequency-modulated continuous-wave (FMCW) radar system having multiple receiving channels, in an embodiment.

FIG. 4 illustrates a block diagram of a frequency-modulated continuous-wave (FMCW) radar system 100 having multiple receiving channels, in an embodiment. For simplicity, only components used for receiving radar signals are illustrated, and components for transmitting radar signals may be omitted. In addition, not all components used for receiving radar signals are illustrated. The FMCW radar system 100 in FIG. 4 may also be referred to as an FMCW radar receiver 100.

In the example of FIG. 4, the FMCW radar receiver 100 has a plurality of receiving (Rx) channels, such as Rx channels 101_1, 101_2, 101_3, and 101_4, with each Rx channel being coupled to a respective Rx antenna 111. The Rx channels 101_1, 101_2, 101_3, and 101_4 are collectively referred to as Rx channels 101 in the discussion herein. The number of Rx channels 101 in FIG. 4 is merely an example and non-limiting, the FMCW radar receiver 100 may have any number of Rx channels 101.

The Rx channels 101 represent the multiple, parallel, receiving channels in the FMCW radar receiver 100, which may be used in array processing applications. As illustrated in FIG. 4, each of the Rx channels 101 includes a mixer 13, an amplifier 15 coupled to an output of the mixer 13, a filter 17 (e.g., low-pass filter, high-pass filter, or band-pass filter) coupled to an output of the amplifier 15, and an analog-to-digital converter (ADC) 19 coupled to an output of the filter 17. The Rx channel 101 also includes a phase shifter 21 (also referred to as a programmable phase shifter). The phase shifter 21 introduces a phase shift to its input signal (e.g., a chirp signal), where the phase shift is determined by a value of a phase shifter control word of the phase shifter. The value of the phase shifter control word may be programmed by, e.g., a micro-controller, a control logic, or the like. In the illustrated embodiment, a chirp signal is send to the input of the phase shifter 21, and the output of the phase shifter 21 is sent to an input terminal of the mixer 13.

As illustrated in FIG. 4, each of the Rx channels 101 further includes a multiplexer (MUX) 11. A first input of the MUX 11 is coupled to a Rx antenna 111, and a second input of the MUX 11 is coupled to a modulated chirp signal 104 (detail discussed hereinafter) generated by a modulation circuit 107. A selection signal applied at a terminal 12 of the MUX 11 selects which input signal is sent to the output of the MUX 11. The output of the MUX 11 is then sent to another input terminal of the mixer 13. In the illustrated embodiment, the FMCW radar receiver 100 can operate in a calibration mode or a normal operation mode. In the calibration mode, the modulated chirp signal 104 from the modulation circuit 107 is selected by the MUX 11 and sent to the mixer 13 for calibrating the phase response of the Rx channel 101. In the normal operation mode, the RF signal from the Rx antenna 111 is selected by the MUX 11 and sent to the mixer 13 for detecting radar targets. Note that the MUX 11 is illustrated in FIG. 4 to show the switching between the calibration mode and the normal operation mode conceptionally. For implementation, the MUX 11 may be replaced by a coupling device (e.g., a passive coupling device). Since there is no RF signal from the Rx antenna 111 during the calibration mode, and since there is no modulated chirp signal 104 from the modulation circuit 107 during the normal operation mode, the coupling device will couple the modulated chirp signal 104 to the mixer 13 in the calibration mode, and will couple the RF signal from the Rx antenna 111 to the mixer 13 in the normal operation mode. For simplicity, the discussion below uses the MUX 11 as means to switch between the calibration mode and the normal operation mode, with the understanding that a coupling device may be used instead.

The digital samples at the output of the ADC 19 in each of the Rx channels 101 are sent to a control logic 120. The control logic 120 may be, e.g., a micro-controller, an application specific integrated circuit (ASCI), or the like. The control logic 120 performs various functions of the FMCW radar receiver 100, such as the calibration of the Rx channels 101 during calibration mode, phase control for the Rx channels 101 during normal operation mode, and processing the ADC samples for detection of radar targets during normal operation mode, as examples.

FIG. 4 further illustrates a splitter 105. The input of the splitter 105 is connected to an input signal 106 (e.g., a chirp signal) generated by, e.g., a voltage-controlled oscillator (VCO) of the FMCW radar receiver 100. Therefore, the input signal 106 may also be referred to as a VCO signal 106, or a chirp signal 106. The VCO signal 106 may also be sent to a Tx antenna(s) during normal operation mode of the FMCW radar receiver 100 for detecting radar targets. The splitter 105 splits the VCO signal 106 and send the VCO signal 106 to the phase shifter 21 in each of the Rx channels 101. The splitter 105 also sent the VCO signal 106 to the input of the modulation circuit 107.

The modulation circuit 107 modulates the VCO signal 106 with a modulating signal 108 (may also be referred to as a modulation signal), which modulating signal 108 may be generated by the control logic 120. In some embodiments, the modulation circuit 107 modulates the chirp signal 106 to generate the modulated chirp signal 104, which is split by another splitter 109 and sent to the MUX 11 in each of the Rx channels 101. Various embodiments of the modulation circuit 107 are discussed hereinafter.

Figure 5:
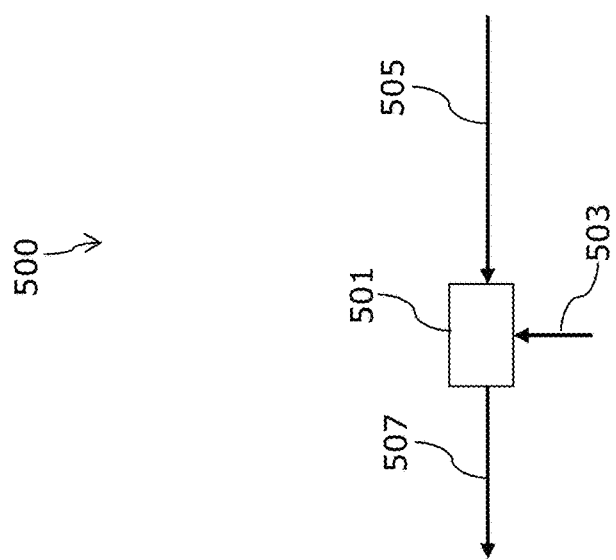
FIG. 5 illustrates a modulation circuit for generating a modulated chirp signal, in an embodiment.

FIG. 5 illustrates a modulation circuit 500 for generating a modulated chirp signal, in an embodiment. The modulation circuit 500 may be used as the modulation circuit 107 in FIG. 4. As illustrated in FIG. 5, the modulation circuit 500 is an amplifier 501 with an enable terminal 503. In the calibration mode, the input terminal 505 of the amplifier 501 is coupled to a chirp signal 106, and the enable terminal 503 is coupled to the modulating signal 108 (see FIG. 4), which is a clock signal (e.g., a 1 MHz clock signal) having binary-values (e.g., a logic high and a logic low) in this example. In some embodiments, when the clock signal has a first value (e.g., a logic high value), the amplifier 501 is enabled and the chirp signal 106 (or a scaled version of the chirp signal) is sent to the output terminal 507 of the amplifier 501; when the clock signal has a second value (e.g., a logic low value), the amplifier 501 is disabled, and a direct-current (DC) signal (e.g., a fixed voltage) is output at the output terminal 507 of the amplifier 501. Therefore, the modulation circuit 500 functions as an On-Off-Keying (OOK) modulator, and the modulated chirp signal in this case is an OOK modulated chirp signal.

Calibration of the phase response of one of the Rx channels 101 is discussed below using the example illustrated in FIGS. 6-11, where the modulation circuit 500 is used to generate the modulated chirp signal 104. The same processing is repeated to calibrate other Rx channels 101 of the FMCW radar receiver 100.

To enter calibration mode, the selection signal at the terminal 12 of the MUX 11 may be set (e.g., by the control logic 120) to a value such that the output of the modulation circuit 107 is sent to the mixer 13. To perform the calibration of the Rx channel 101, a chirp signal 106 is sent to the phase shifter 21 to generate a shifted chirp signal 22 (e.g., a shifted, or delayed, version of the chirp signal 106), and the shifted chirp signal 22 is sent to an input terminal of the mixer 13. The same chirp signal 106 is also sent to the modulation circuit 107, and the modulated chirp signal 104 is sent to another input terminal of the mixer 13. Note that the calibration process sends the chirp signal 106 through the Rx channel 101 multiple times for multiple measurements, with the value of the phase shifter control word set to a different value each time, such that the value of the phase shifter control word is swept across a range of values.

The mixer 13 mixes the modulated chirp signal 104 with the output signal of the phase shifter 21. In particular, during first time intervals when the modulating signal 108 (e.g. a 1 MHz clock signal) has the first value (e.g., a logic high), the modulated chirp signal 104 is the same as (or is a scaled version of) the chirp signal 106. As a result, the mixer 13 outputs a beat signal, which corresponds to the leakage signal discussed above. The frequency of the beat signal during the first time intervals is determined by the difference in the path delays of the two signal paths from the chirp signal 106 at the input of the splitter 105 to the two input terminals of the mixer 13, in some embodiments. Since the difference in the path delays is small, the beat signal generated during the first time intervals has a low frequency and may be referred to as a low-frequency beat signal. The low-frequency beat signal passes through the filter 17 and is sampled by the ADC 19. Note that in the calibration mode, the starting time of the chirp signal 106, the starting time of modulating signal 108, and the starting time of the ADC 19 are synchronized (e.g., starting at the same time).

During second time intervals when the modulating signal 108 (e.g. a 1 MHz clock signal) has the second value (e.g., a logic low), the modulated chirp signal 104 is a DC signal. Note that the frequency of the output signal of the mixer 13 is equal to the difference between the frequency of the shifted chirp signal 22 (e.g., having frequency components around 50 GHz) and the frequency of the modulated chirp signal 104 (e.g. a DC signal, or zero Hz). Therefore, the output signal of the mixer 13 during the second time intervals is a high frequency signal (e.g., having signal components around 50 GHz), and therefore, is filtered out (e.g., attenuated, or removed) by the filter 17 (e.g., a low pass filter). Due to, e.g., offset in the analog circuit, the output of the filer 17 has an offset voltage (e.g., a DC offset voltage). Therefore, during the second intervals of the modulating signal 108, the analog signal at the input of the ADC 19 may have a non-zero voltage. The same offset voltage also shifts the low-frequency beat signal at the input of the ADC 19 during the first time intervals of the modulating signal 108.

Figure 6:
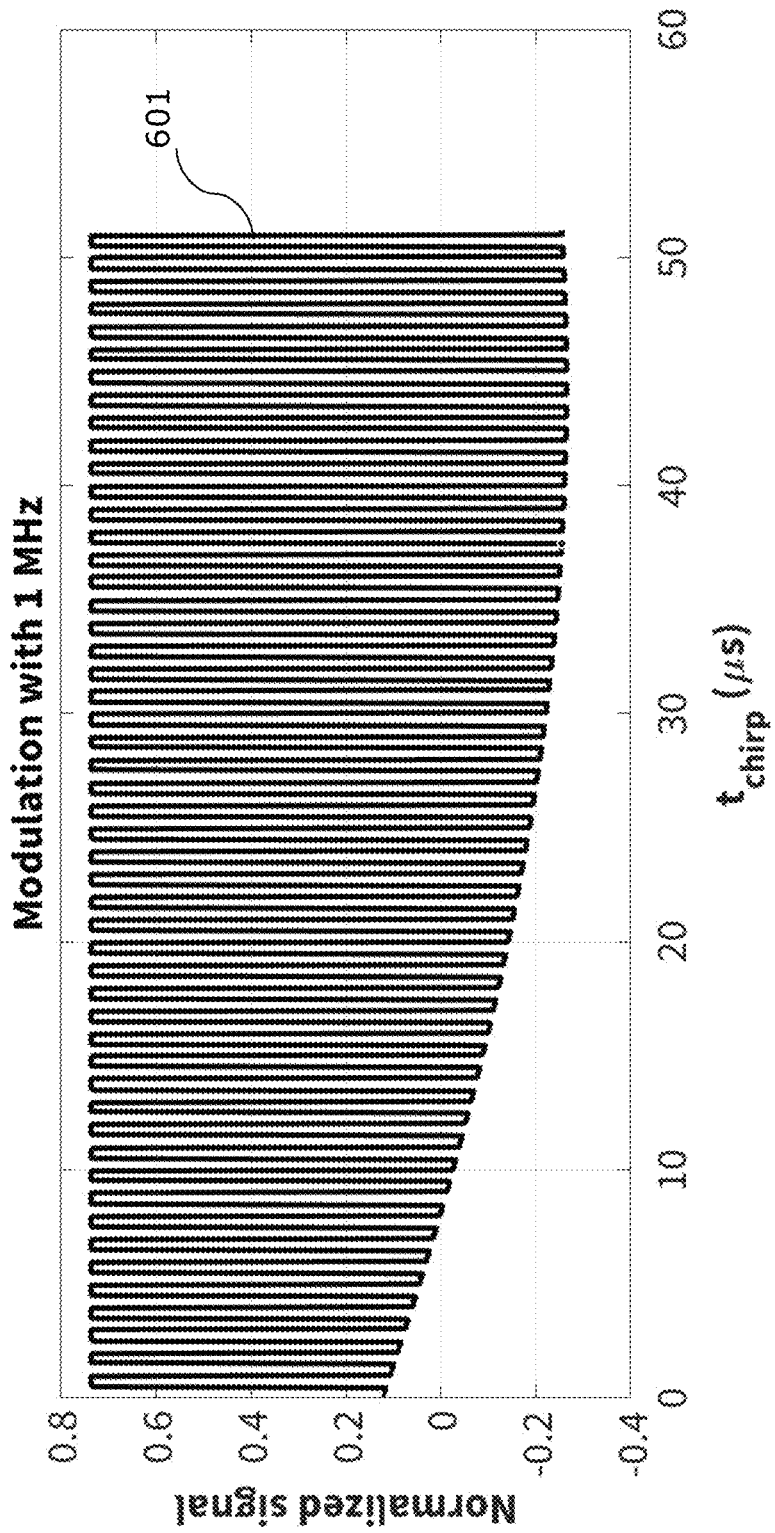
FIG. 6 illustrates data samples produced by an analog-to-digital converter (ADC) in a receiving channel of the FMCW radar system using the modulation circuit of FIG. 5, in an embodiment.

FIG. 6 illustrates a curve 601 obtained through computer simulations. The curve 601 illustrates the values of the digital samples (generated by the ADC 19) of the output signal of the filter 17 in a chirp period $T_{chirp}$, when the modulation circuit 500 of FIG. 5 is used to generate the modulated chirp signal 104, in an embodiment. In the example of FIG. 6, the chirp signal has a chirp duration $T_{chirp}$ about 51 μs, and the operating frequency of the chirp signal 106 increases linearly from about 58 GHz to about 63 GHz within the chirp duration. In other words, the frequency band of the chirp signal 106 is between about 58 GHz and about 63 GHz. In the example of FIG. 6, the modulating signal 108 is a 1 MHz clock signal, the ADC 19 samples at a sampling rate of 20 MHz, and 1024 samples are generated by the ADC 19 for each chirp signal 106 sent through the Rx channel 101.

As illustrated in FIG. 6, the curve 601 has an upper envelope with a fixed value, which corresponds to the DC offset voltage discussed above. The lower envelope of the curve 601 is (a portion of) a low-frequency sinusoidal signal, which corresponds to the low-frequency beat signal discussed above. Therefore, the curve 601 is also referred to a modulated beat signal, which is the low-frequency beat signal modulated (e.g., gated) by the modulating signal 108 (e.g., a clock signal). Note that the chirp period $T_{chip}$ only covers a fraction of a complete cycle (e.g., a period) of the low-frequency beat signal.

Figure 7:
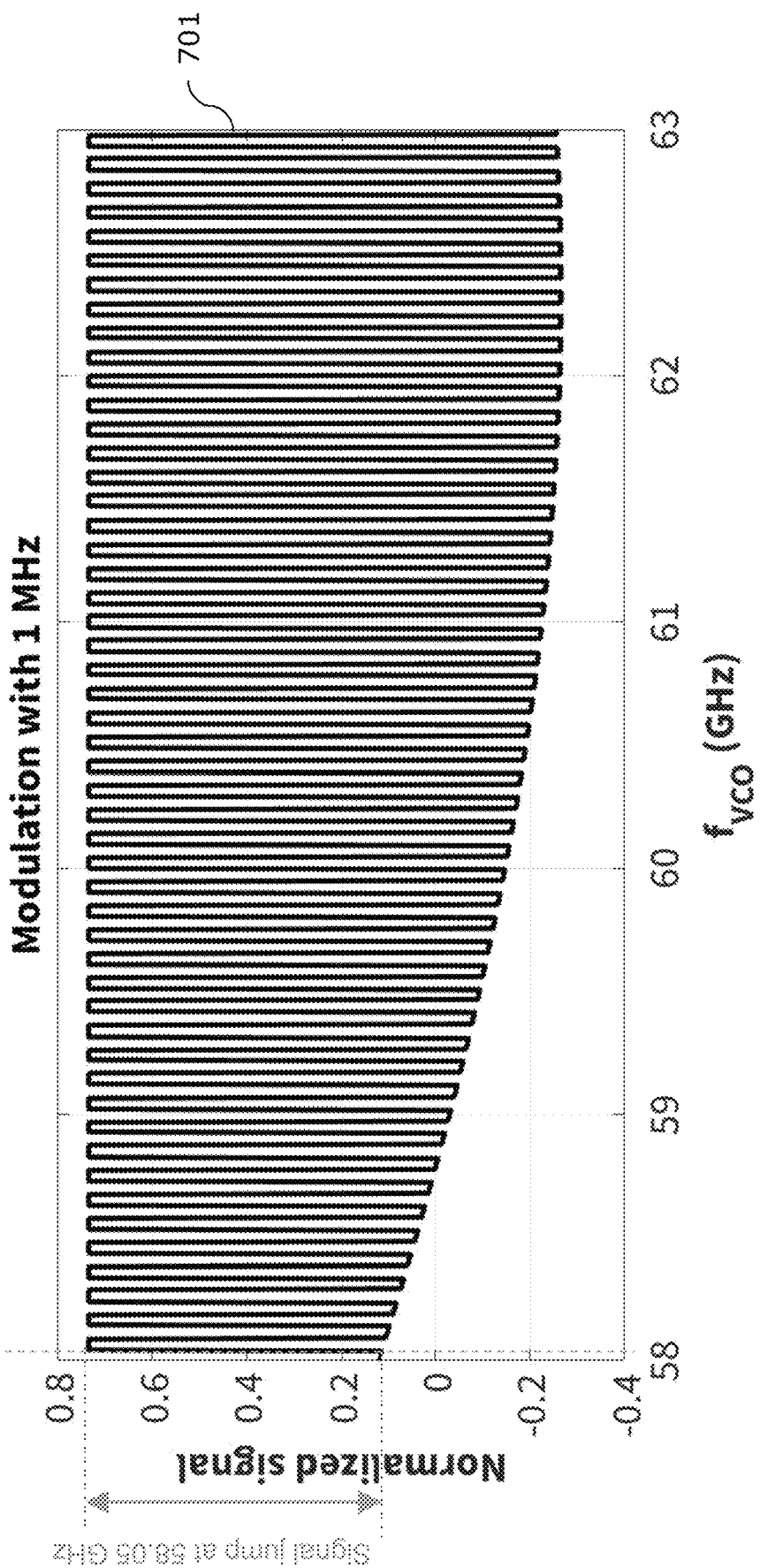
FIG. 7 illustrates another representation of the data samples of FIG. 6, in an embodiment.

FIG. 7 illustrates another representation of the curve 601 of FIG. 6, in an embodiment. Since the operating frequency of the chirp signal 106 ramps up linearly during the chirp period $T_{chirp}$, and the starting frequency $f_{STAT}$ and the stopping frequency $f_{STOP}$ are known, the time location (also referred to as a time stamp) of each data sample within the chirp period $T_{chirp}$ can be converted to a corresponding operating frequency of the chirp signal 106 at the time location. Therefore, the X-axis of FIG. 7 shows the operating frequencies of the data samples in a chirp period.

The difference between the lower bound and the upper bound of the curve 701 should give the amplitude of the low-frequency beat signal. Note that due to the filtering effect (e.g., averaging effect) of the filter 17 (e.g., a low pass filter), the output of the filter 17 may not have a step-shaped sudden change after each transition from one of the first time intervals to one of the second time intervals. Instead, it may take a short while (e.g., a few ADC samples) for the output of the filter 17 to settle down. Therefore, in order to obtain a better measurement of the amplitude of the low-frequency beat signal, one may use the method describe below.

Note that the curve 701, which corresponds to the modulated low-frequency beat signal, has a plurality of first segments of continuous data samples with values corresponding to the lower envelope of the curve 701, and has a plurality of second segments of continuous data samples with values corresponding to the upper envelope of the curve 701, where the first segments and the second segments are interleaved. One may calculate the difference (also referred to as signal jump) between the last data sample within a first segment of continuous data samples and the first data sample within a subsequent (e.g., immediately following) second segment of continuous data sample. The difference is used as an estimate of the amplitude of the low-frequency beat signal at a frequency that corresponds to the time stamp of the last data sample within the first segment. The above described method is used to process the data samples in FIG. 7, and the results are shown in FIG. 8.

Figure 8:
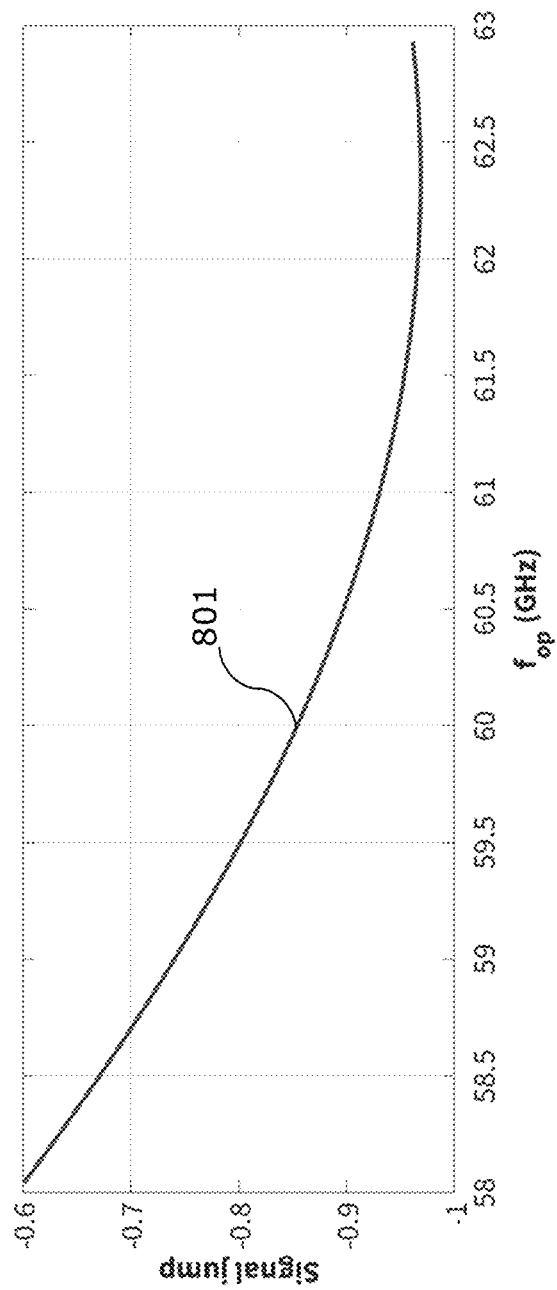
FIG. 8 illustrates an amplitude curve that shows the amplitude of a beat signal at a plurality of operating frequencies of the FMCW radar system, in an embodiment.

FIG. 8 illustrates an amplitude curve 801 that shows the amplitude of the low-frequency beat signal at a plurality of operating frequencies of the chirp signal 106, in an embodiment. Note that since the last data sample of each of the first segments is used in the computation of the amplitude curve 801, the number of frequencies within the frequency band of the chirp signal 106 in the amplitude curve 801 is reduced compared with that of FIG. 7.

Figure 9:
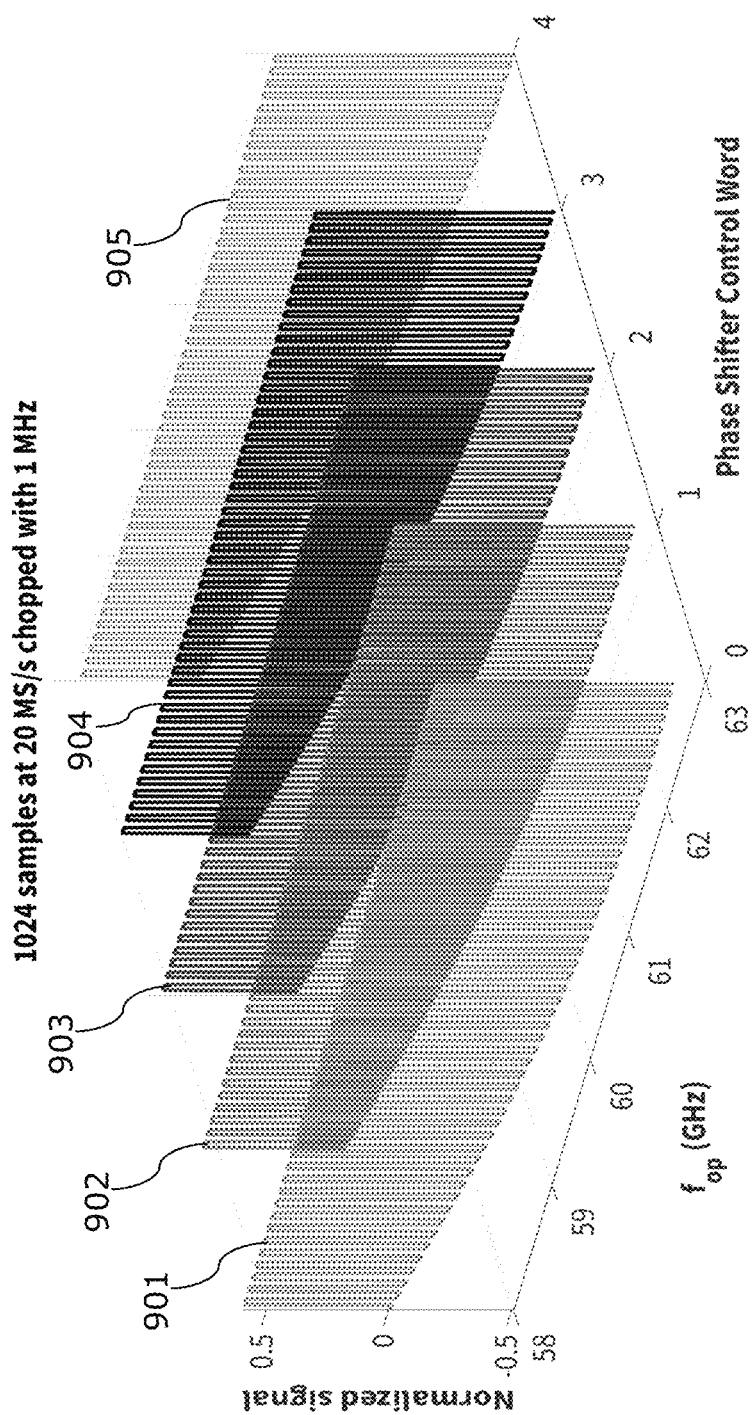
FIG. 9 illustrates multiple data curves of a receiving channel of the FWCM radar system, where the multiple data curves correspond to different values of a phase shifter control word in the receiving channel, in an embodiment.

FIG. 9 illustrates multiple curves 901, 902, 903, 904, and 905 in a three-dimensional plot. Each of the curves 901, 902, 903, 904, and 905 is similar to the curve 701 of FIG. 7, but with a different value for the phase shifter control word of the phase shifter 21, in an embodiment. FIG. 9 shows five curves as a non-limiting example. Other numbers of curves may be generated by sending the chirp signal 106 multiple times through the Rx channel 101, with a different value for the phase shifter control word each time. Note that each time the chirp signal 106 is sent through the Rx channel 101, the starting time of the chirp signal 106, the starting time of modulating signal 108, and the starting time of the ADC 19 are synchronized (e.g., starting at the same time). Each of the curves 901-905 in FIG. 9 can be processed to obtain a respective amplitude curve, using the same processing as that for the amplitude curve 801 of FIG. 8. Each of the amplitude curves shows the amplitude of the low-frequency beat signal at a plurality of operating frequencies of the chirp signal 106 for a corresponding value of the phase shifter control word.

Figure 10:
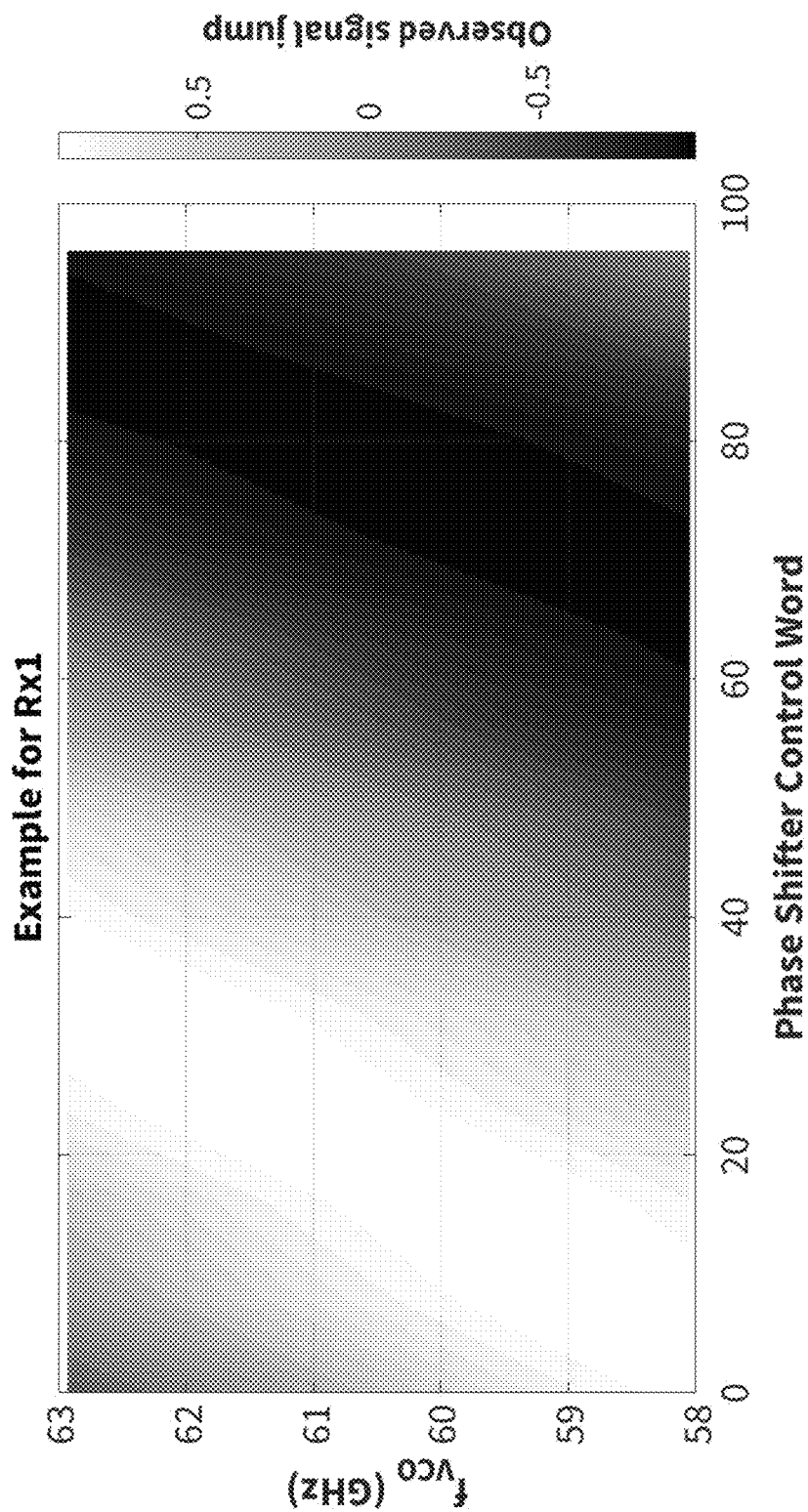
FIG. 10 is a contour plot of the amplitude of a beat signal in a receiving channel of the FWCM radar system, in an embodiment.

FIG. 10 is a contour plot using data from the amplitude curves obtained as discussed above for FIG. 9, in an embodiment. In FIG. 10, the range of values for the phase shifter control word is wider than that illustrated in FIG. 9, since FIG. 9 illustrates some, but not all, of the curves obtained.

The data points on a horizontal line of the contour plot of FIG. 10, which correspond to amplitudes of the low-frequency beat signal at different values of the phase shifter control word, but at a same operating frequency of the chirp signal 109, are used by a curve fitting process to generate an estimate of a sinusoidal signal. In an example, a sine wave curve fitting process is performed to find a sine wave that fits the data point on the horizontal line of the contour plot (e.g., FIG. 10). Sine wave curve fitting is known in signal processing, details are not repeated here. As an example, the estimated sine wave through curve fitting may be denoted as $y=A\sin(2\pi fx+\emptyset)+C$, where A is the amplitude of the sine wave, f is the frequency of the sine wave, x is the value of the phase shifter control word, $\emptyset$ is the phase offset of the sine wave, and C is the DC offset of the sine wave. The argument of the sine wave, which is $2\pi fx+\emptyset$, is the calibrated phase value for the Rx channel 101 when a value of x is used as the value of the phase shifter control word.

Figure 11:
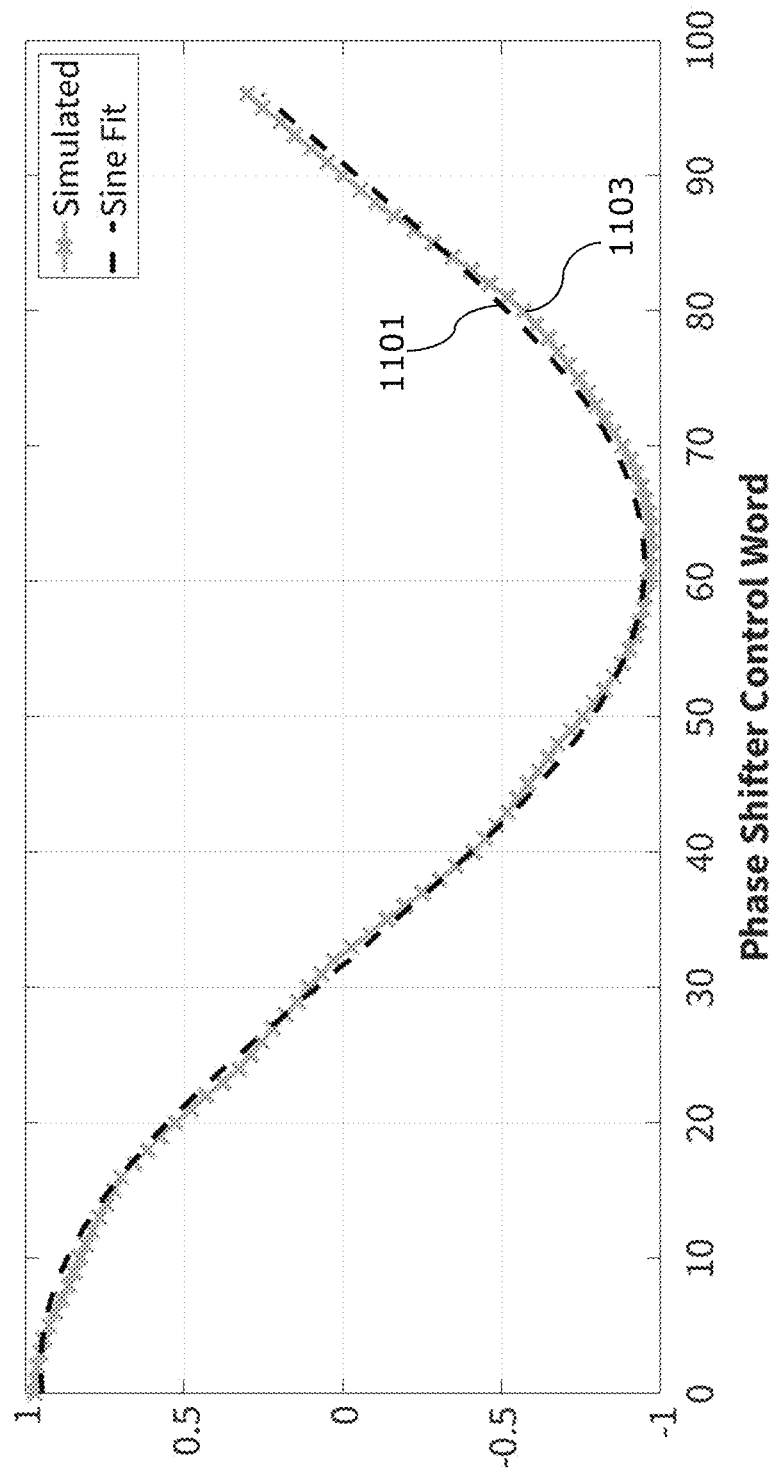
FIG. 11 illustrates a sine wave curve fitting for generating a phase response curve of a receiving channel of a FWCM radar system, in an embodiment.

FIG. 11 illustrates an example of a sine wave generated by the sine wave curve fitting process, in an embodiment. In FIG. 11, the curve 1103 shows the data point along a horizontal line of the contour plot of FIG. 10, and the curve 1101 is the sine wave obtained using the curve fitting process. The curve 1101 is also referred to as a phase response curve for the Rx channel 101, which illustrates phase values of the Rx channel 101 at different values of the phase shifter control word. Note that the curve fitting process could produce good fitting results (e.g., good estimates of the phase response) even with limited numbers of data points. For example, using a fraction of the data points in FIG. 11 may still produce a good sine curve fitting results.

The curve fitting process discussed above is repeated for each line of data points in the contour plot of FIG. 10, for a plurality of operating frequencies of the chirp signal 106. As a result, a plurality of sine waves (e.g., phase response curves) are formed, each corresponding to a respective operating frequency of the chirp signal 106. The data in the plurality of phase response curves are plotted as a contour plot in FIG. 12A.

Figures 12A, 12B:
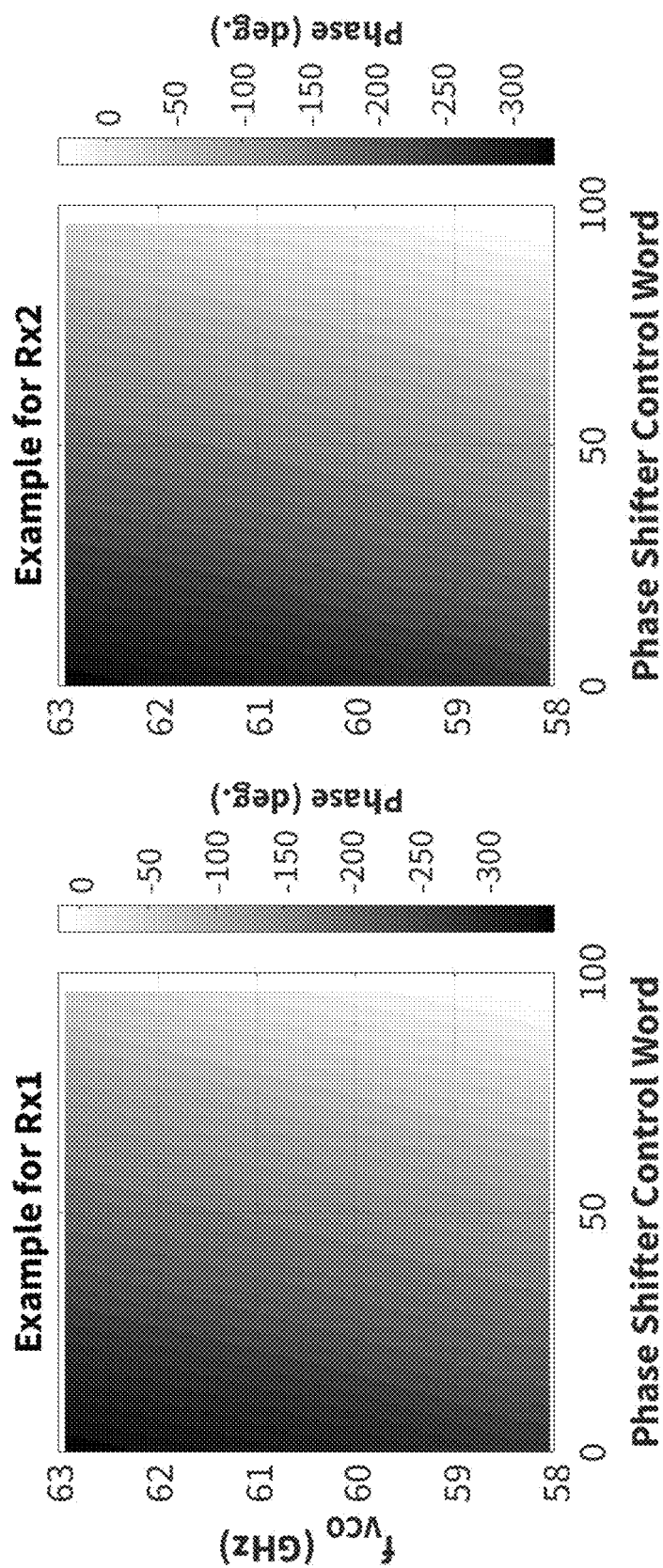
FIGS. 12A and 12B illustrate contour plots of the phases of a first receiving channel and a second receiving channel, respectively, of a FWCM radar system, in an embodiment.

The above discussed process for obtaining the contour plot in FIG. 12A is performed for each of the Rx channels 101, such that a contour plot similar to FIG. 12A is obtained for each of the Rx channels 101. FIG. 12B shows an example contour plot for a second Rx channel 101 of the FMCW radar receiver 100. Note that calibration of the Rx channels 101 may be performed in parallel in the calibration mode. As illustrated in FIG. 4, the same chirp signal 106, the same modulated chirp signal 104, and the same value for the phase shifter control word are sent to each of the Rx channels 101 in parallel during the calibration mode. Furthermore, note that in the contour plot of FIGS. 12A and 12B, the data points along a sample column correspond to a plurality of (discrete) frequencies within the frequency band of the chirp signal. Interpolation may be performed to produce data points that lie between the plurality of discrete frequencies in FIGS. 12A and 12B. Interpolation techniques are known in the art, details are not repeated here.

The contour plots, such as those in FIGS. 12A and 12B, may be used in normal operation mode to find the optimum or near-optimum value for the phase shifter control word in each of the Rx channels 101. To enter normal operation mode, the MUX 11 selects the RF signal from the Rx antenna 11. The chirp signal 106 is sent to the Tx antenna(s) (not shown in FIG. 4) and to the phase shifter 21 in each of the Rx channels 101. In the illustrated embodiments, the starting time of the chirp signal 106, the starting time of the ADC 19 are synchronized (e.g., start at the same time) each time a chirp signal 106 is sent. The contour plots for each Rx channels 101, such as those in FIGS. 12A and 12B, which shows the phase response of each Rx channel 101 for different values of the phase shifter control word, are used to set the values of the phase shifter control word in each Rx channel 101.

As discussed earlier, in order to maximize the SNR, it may be advantageous for some radar systems to minimize the peak-to-peak value of the data samples in a chirp period, which means that the value for the phase shifter control word should result in a phase of the Rx channel 101 being at or around, e.g., $\pi/2$ for the sine wave curve. Note that the operating frequency of the chirp signal 106 varies within a chirp period $T_{chirp}$. In other words, a same value for the phase shifter control word results in different phases of the Rx channel 101 at different operating frequencies of the chirp signal. In order to determine the value of the phase shifter control word used for the frequency band of the chirp signal, a look-up table may be formed by combining the different phase values in a same column of the contour plot (e.g., FIG. 12A or 12B) into a single entry in the look-up table. As an example, the average value of phases, calculated using data points along each column of the contour plot (e.g., FIG. 12A or 12B), may be used as an average phase of the Rx channel 101 for the corresponding value of the phase shifter control word. As another example, the phase at the middle of each column of the contour plot (e.g., FIG. 12A or 12B) may be used as an average phase of the Rx channel 101 for the corresponding value of the phase shifter control word. Once the look-up table is formed, a value of the phase shifter control word that corresponds to an average phase value of $\pi/2$, or $3\pi/2$, in the look-up table may be used for the respective Rx channel 101.

The above described calibration process can be performed in-situ, e.g., after the FMCW radar system 100 is deployed, either periodically or whenever deemed necessary. This allows the radar system to track, and update, the phase response of each of the Rx channels 101.

In array processing, the multiple Rx channels 101 may be used together for calculating the angle-of-arrival (AOA). In AOA calculation, the phase differences between the Rx channels 101 are used. Recall that to maximize the SNR, each Rx channel 101 may be introduced a phase shift by setting a different value for the phase shifters 21. The phase differences between the Rx channels 101 caused by the introduced phase shifts need to be subtracted from phase differences used in the AOA calculation. This may poses a challenge for conventional radar systems without the currently disclosed in-situ calibration method. The current disclosure provides the contour plot for each Rx channel 101 (e.g., FIG. 12A or 12B), which shows the phase of each Rx channel 101 for different values of the phase shifter control word. It is then straightforward to look up the phase values for different setting (e.g., values) of the phase shifter control word for different Rx channels 101, using their respective contour plot (e.g., FIG. 12A or 12B). The phase differences between different Rx channels 101 can then be calculated and used in the AOA calculation. As a result, the AOA results are improved by the disclosed method.

Figure 13:
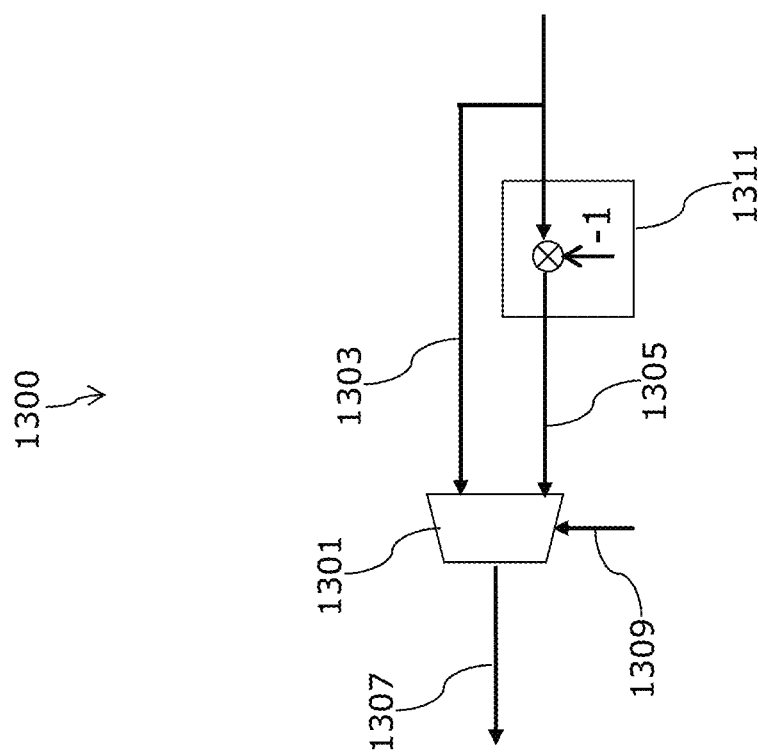
FIG. 13 illustrates a modulation circuit for generating a modulated chirp signal, in another embodiment.

FIG. 13 illustrates a modulation circuit 1300 for generating a modulated chirp signal, in another embodiment. The modulation circuit 1300 may be used as the modulation circuit 107 in FIG. 4. The modulation circuit 1300 performs a BPSK modulation of the chirp signal. In particular, a clock signal (e.g., having a logic value and a logic low value) is applied to the selection terminal 1309 of a MUX 1301. Depending on the value of the clock signal, the chirp signal applied at an input terminal 1303 of the MUX 1301, or an inverse of the chirp signal (inverted by an inverter 1311) applied at an input terminal 1305 of the MUX 1301, is output at the output terminal 1307 of the modulation circuit 1300.

Following similar analysis discussed above for the OOK modulated chirp signal, skilled artisans will readily appreciate that the output signal of filter 17, when the modulation circuit 1300 is used, has signal amplitude jumps twice that of the OOK modulated chirp signal.

Figure 14:
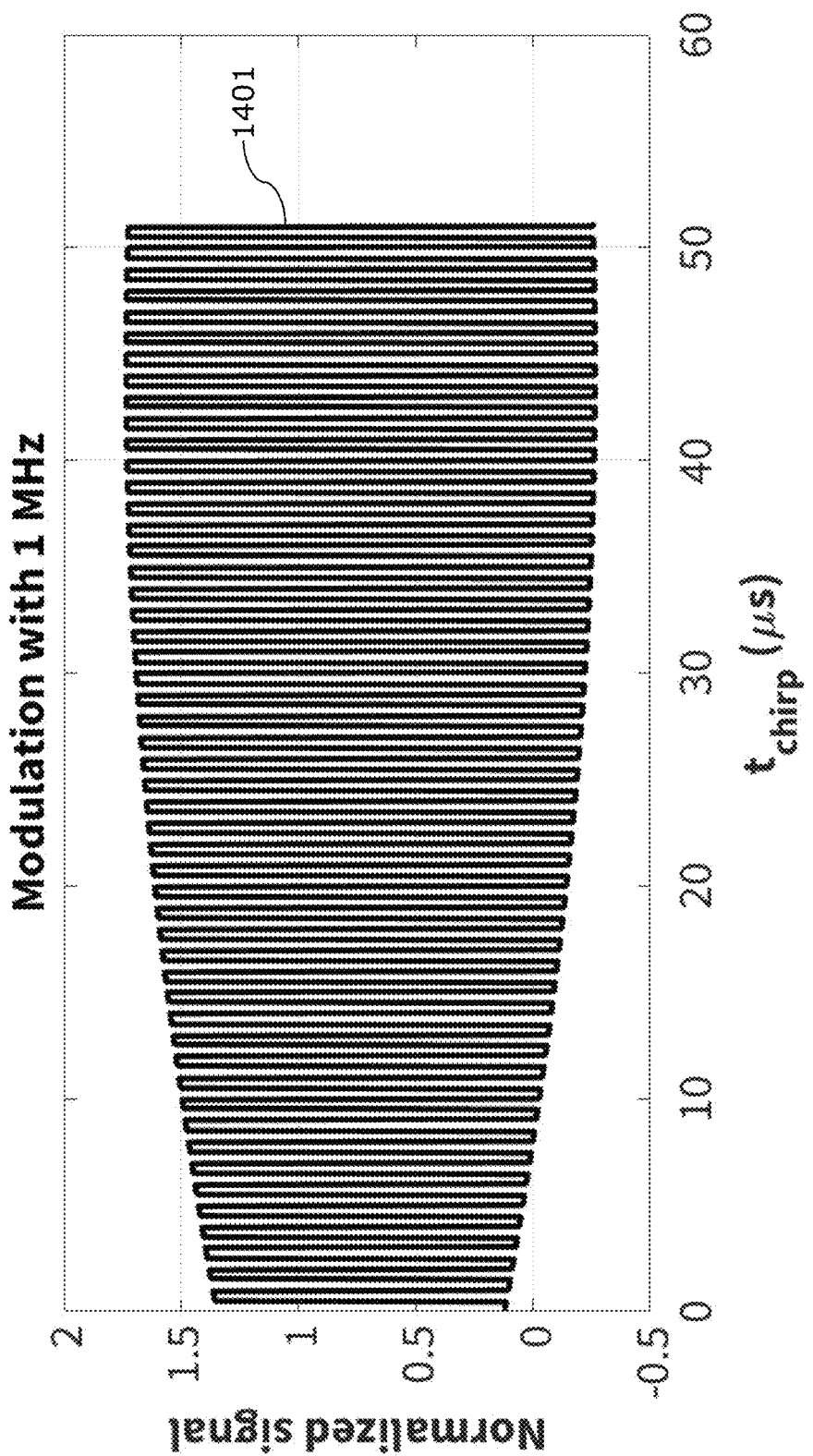
FIG. 14 illustrates data sample generated by an analog-to-digital converter (ADC) in a receiving channel of the FMCW radar system using the modulation circuit of FIG. 13, in an embodiment.
Figure 15:
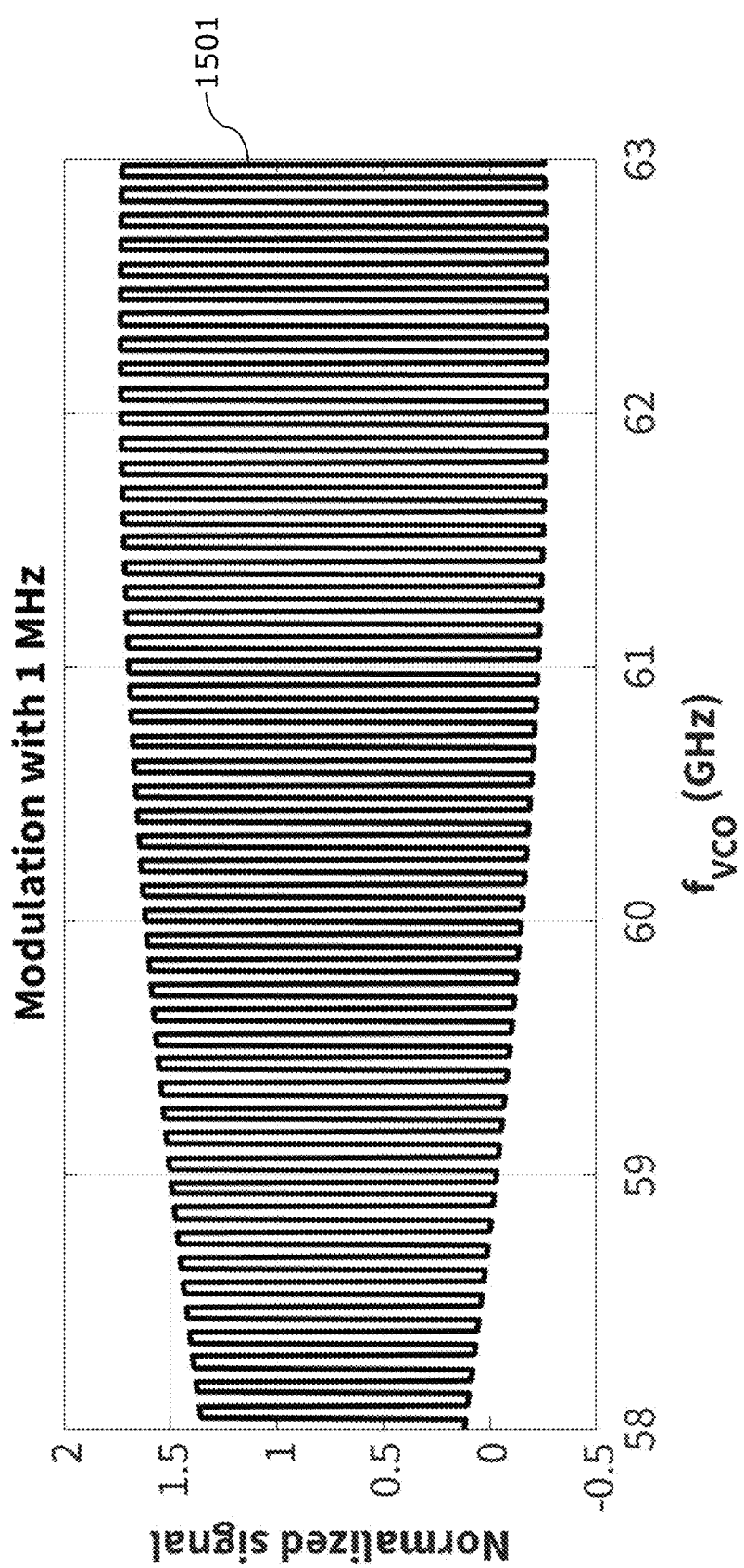
FIG. 15 illustrates another representation of the data samples of FIG. 14, in an embodiment.

FIG. 14 illustrates digital samples of the output of the filter 17 using the modulation circuit of FIG. 13, in an embodiment. FIG. 15 illustrates another representation of the data samples of FIG. 14, in an embodiment. FIG. 15 is generated by converting the time stamp of each data sample into a respective operating frequency of the chirp signal, similar to FIG. 7.

The same or similar processing may be performed to obtain the phase response curves for FMCW receivers using the BPSK modulated chirp signal. Details are not repeated.

Besides BPSK, other modulation schemes, such as multiple-level amplitude modulation (AM), or other forms of PSK modulation (e.g., QPSK, 8-PSK) may be used for generating the modulated chirp signal 104. The modulating signal 108 for these modulation schemes may no longer be a single-bit (e.g., binary-valued) clock signal. Instead, the modulating signal 108 may be, e.g., a two-bit, or a three-bit signal that indicates the amplitude level of the AM modulation or the phase of the QPSK/8-PSK modulations. These and other variations are fully intended to be included within the scope of the present disclosure.

FIG. 16 illustrates a flow chart of a method 1000 for calibrating a receiving (Rx) channel of an FWCM radar system, in some embodiments. It should be understood that the example method shown in FIG. 16 is merely an example of many possible example methods. One of ordinary skill in the art would recognize many variations, alternatives, and modifications. For example, various steps as illustrated in FIG. 16 may be added, removed, replaced, rearranged, or repeated.

Referring to FIG. 16, at block 1010, a first measurement of the Rx channel is performed by: sending a chirp signal through a first signal path to a first input terminal of a mixer of the Rx channel, wherein the first signal path comprises a modulation circuit that modulates the chirp signal with a modulating signal to generate a modulated chirp signal; sending the chirp signal through a second signal path to a second input terminal of the mixer, wherein the second signal path comprises a phase shifter that introduces a phase shift to the chirp signal in accordance with a phase shifter control word of the phase shifter, wherein the phase shifter control word has a first value for the first measurement; filtering an output signal of the mixer using a filter; sampling an output signal of the filter to generate digital samples using an analog-to-digital converter (ADC), wherein the output signal of the filter comprises a modulated beat signal that is a beat signal modulated by the modulating signal; and determining a first curve using the digital samples, wherein the first curve illustrates amplitudes of the modulated beat signal at a plurality of frequencies within a frequency band of the chirp signal when the phase shifter control word has the first value. At block 1020, a second measurement of the Rx channel is performed and a second curve is determined that illustrates the amplitudes of the modulated beat signal at the plurality of frequencies when the phase shifter control word has a second value, wherein the second measurement is performed using a same method as the first measurement but with the phase shifter control word having the second value. At block 1030, for each frequency of the plurality of frequencies, a phase response curve is generated using at least the amplitudes of the modulated beat signal in the first curve and the second curve that correspond to the each frequency, wherein the phase response curve illustrates phases of the Rx channel for different values of the phase shifter control word.

Examples of the present invention are summarized here. Other examples can also be understood from the entirety of the specification and the claims filed herein.

Example 1. In an embodiment, a method of calibrating a receiving (Rx) channel of a frequency-modulated continuous-wave (FMCW) radar system, the method includes: performing a first measurement of the Rx channel by: sending a chirp signal through a first signal path to a first input terminal of a mixer of the Rx channel, wherein the first signal path comprises a modulation circuit that modulates the chirp signal with a modulating signal to generate a modulated chirp signal; sending the chirp signal through a second signal path to a second input terminal of the mixer, wherein the second signal path comprises a phase shifter that introduces a phase shift to the chirp signal in accordance with a phase shifter control word of the phase shifter, wherein the phase shifter control word has a first value for the first measurement; filtering an output signal of the mixer using a filter; sampling an output signal of the filter to generate digital samples using an analog-to-digital converter (ADC), wherein the output signal of the filter comprises a modulated beat signal that is a beat signal modulated by the modulating signal; and determining a first curve using the digital samples, wherein the first curve illustrates amplitudes of the modulated beat signal at a plurality of frequencies within a frequency band of the chirp signal when the phase shifter control word has the first value. The method further includes: performing a second measurement of the Rx channel and determining a second curve that illustrates the amplitudes of the modulated beat signal at the plurality of frequencies when the phase shifter control word has a second value, wherein the second measurement is performed using a same method as the first measurement but with the phase shifter control word having the second value; and for each frequency of the plurality of frequencies, generating a phase response curve using at least the amplitudes of the modulated beat signal in the first curve and the second curve that correspond to the each frequency, wherein the phase response curve illustrates phases of the Rx channel for different values of the phase shifter control word.

Example 2. The method of Example 1, wherein a frequency of the chirp signal increases linearly over a period of time from a first frequency to a second frequency.

Example 3. The method of Example 1, wherein the modulating signal has a plurality of values, wherein the modulated chirp signal comprises a scaled version of the chirp signal, wherein a scaling factor of the scaled version of the chirp signal is time-varying and changes in accordance with the value of the modulating signal.

Example 4. The method of Example 3, wherein the modulated beat signal comprises a scaled version of the beat signal, when a scaling factor of the scaled version of the beat signal is time-varying and changes in accordance with the value of the modulating signal.

Example 5. The method of Example 4, wherein the digital samples comprises first digital sample that are generated when the modulating signal has a first value, and comprises second digital samples that are generated when the modulating signal has a second value different from the first value, wherein the first digital samples comprise first segments of continuous data samples, and the second digital samples comprise second segments of continuous data samples, wherein the first segments are interleaved with the second segments.

Example 6. The method of Example 5, wherein determining the first curve comprises, for each of the first segments: determining a value of a last data sample in each of the first segments; computing a difference between the value of the last data sample and a value of an adjacent data sample in the second segments; converting a time location of the last data sample within the chirp signal into a frequency within the frequency band of the chirp signal; and assigning the computed difference as the amplitude of the modulated beat signal at the converted frequency.

Example 7. The method of Example 1, wherein generating the phase response curve comprises: performing a curve fitting using at least the amplitudes of the modulated beat signal in the first curve and the second curve that correspond to the each frequency.

Example 8. The method of Example 7, wherein the curve fitting is performed using a sine wave curve.

Example 9. The method of Example 1, wherein a starting time of the chirp signal, a starting time of modulating signal, and a starting time of the ADC are synchronized.

Example 10. In an embodiment, a method of operating a frequency-modulated continuous-wave (FMCW) radar system having multiple receiving (Rx) channels includes: calibrating the FMCW radar system, which comprises: setting the Rx channels in a calibration mode, wherein each of the Rx channels includes a mixer, a programmable phase shifter coupled to a first input terminal of the mixer, a filter coupled to an output terminal of the mixer, and an analog-to-digital converter (ADC) coupled to an output terminal of the filter; and sweeping a value of a phase shifter control word of the programmable phase shifter in each of the Rx channels across a range of values, wherein the value of the phase shifter control word sets a phase shift in the programmable phase shifter, wherein the sweeping comprises, for each of the Rx channels: setting a value for the phase shifter control word of the programmable phase shifter; sending a chirp signal to the programmable phase shifter, sending a modulated chirp signal to a second input terminal of the mixer, wherein an output signal at the output terminal of the mixer comprises a beat signal; and for each of the range of values of the phase shifter control word, forming an amplitude curve based on data samples from the ADC in the Rx channel, wherein the amplitude curve illustrates amplitudes of the beat signal at a plurality of frequencies within an operating frequency band of the FMCW radar system. Calibrating the FMCW radar system further includes: after forming the amplitude curve, for each of the Rx channels and for each frequency of the plurality of frequencies, performing a curve fitting to generate a phase response curve using the amplitudes of the beat signal at the range of values of the phase shifter control word, wherein the phase response curve illustrates phases of the Rx channel for the range of values of the phase shifter control word.

Example 11. The method of Example 10, wherein the modulated chirp signal comprises a scaled version of the chirp signal, wherein a scaling factor of the scaled version of the chirp signal is time-varying and changes in accordance with a value of a modulating signal, wherein the value of the modulating signal is time-varying.

Example 12. The method of Example 11, wherein the data samples captured in each of the Rx channels for forming the amplitude curve includes: first data samples captured when the modulating signal has a first value; and second data samples captured immediately after the first data samples when the modulating signal has a second value, wherein forming the amplitude curve comprises: computing a difference between a last data sample of the first data samples and a first data sample of the second data samples; converting a time stamp of the last data sample within the chirp signal into a frequency within the operating frequency band of the FMCW radar system; and assigning the computed difference as the amplitude of the beat signal at the converted frequency.

Example 13. The method of Example 10, wherein the curve fitting is performed using a sine wave curve.

Example 14. The method of Example 10, further comprising, operating the FMCW radar system in a normal operation mode, comprising: setting the Rx channels in a normal operation mode, wherein in the normal operation mode, a first input signal to the mixer in each of the Rx channels is a radio frequency (RF) signal from a respective receiving antenna, and a second input signal to the mixer in each of the Rx channels is an output of the programmable phase shifter, wherein the phase shifter control words of the programmable phase shifters in the Rx channels are set to different values.

Example 15. The method of Example 14, wherein the different values for the phase shifter control words are chosen based on the phase response curves generated in the calibration mode.

Example 16. The method of Example 14, wherein operating the FMCW radar system in the normal operation mode further comprises: for each of the Rx channels, determining a phase value of the Rx channel for a respective phase shifter control word using the phase response curves for the Rx channel; computing phase differences between the phase values of the Rx channels; and computing an angle of arrival of a radar target using the computed phase differences.

Example 17. In an embodiment, a frequency-modulated continuous-wave (FMCW) radar system includes: a plurality of receiving (Rx) channels, wherein each of the Rx channels comprises a mixer, a programmable phase shifter coupled to a first input terminal of the mixer, an filter coupled to an output terminal of the mixer, and an analog-to-digital converter (ADC) coupled to an output terminal of the filter; and a control logic coupled to the ADCs in the Rx channels, wherein the control logic is configured to calibrate each of the Rx channels by: setting the Rx channel in a calibration mode; generating a plurality of amplitude curves for the Rx channel, wherein each of the plurality of amplitude curves is generated by: setting a phase shifter control word of the programmable phase shifter in the Rx channel to a different value; sending a chirp signal to an input terminal of the programmable phase shifter; sending a modulated chirp signal to a second input terminal of the mixer, wherein an output signal at the output terminal of the mixer comprises a beat signal; and computing, using data samples from the ADC in the Rx channel, amplitudes of the beat signal at a plurality of frequencies within an operating frequency band of the FMCW radar system; and after generating the plurality of amplitude curves, for each of the Rx channels and for each frequency of the plurality of frequencies, performing a sine wave curve fitting to generate a phase response curve using the amplitudes of the beat signals at the different values of the phase shifter control word, wherein the phase response curve illustrates phases of the Rx channel at different values of the phase shifter control word.

Example 18. The FMCW radar system of Example 17, wherein the modulated chirp signal is the chirp signal modulated by a modulating signal, wherein the modulated chirp signal comprises a scaled version of the chirp signal, wherein a scaling factor of the scaled version of the chirp signal is time-varying and changes in accordance with a value of a modulating signal, wherein the value of the modulating signal is time-varying.

Example 19. The FMCW radar system of Example 18, wherein an output signal at the output terminal of the filter comprises a scaled version of the beat signal, when a scaling factor of the scaled version of the beat signal is time-varying and changes in accordance with the value of the modulating signal.

Example 20. The FMCW radar system of Example 17, wherein the control logic is further configured to: setting each of the Rx channels in a normal operation mode; for each of the Rx channels, sending a respective delayed chirp signal and a radio frequency (RF) signal from a respective receiving antenna to the first input terminal and the second input terminal of the mixer, respectively; for each of the Rx channels, determining a phase value for the Rx channel for a respective phase shifter control word using the phase response curves for the Rx channel; computing phase differences between the phase values of the Rx channels; and computing an angle of arrival of a radar target using the computed phase differences.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A method of calibrating a receiving (Rx) channel of a frequency-modulated continuous-wave (FMCW) radar system, the method comprising:
   performing a first measurement of the Rx channel by:
   sending a chirp signal through a first signal path to a first input terminal of a mixer of the Rx channel, wherein the first signal path comprises a modulation circuit that modulates the chirp signal with a modulating signal to generate a modulated chirp signal;
   sending the chirp signal through a second signal path to a second input terminal of the mixer, wherein the second signal path comprises a phase shifter that introduces a phase shift to the chirp signal in accordance with a phase shifter control word of the phase shifter, wherein the phase shifter control word has a first value for the first measurement;
   filtering an output signal of the mixer using a filter;
   sampling an output signal of the filter to generate digital samples using an analog-to-digital converter (ADC), wherein the output signal of the filter comprises a modulated beat signal that is a beat signal modulated by the modulating signal; and
   determining a first curve using the digital samples, wherein the first curve illustrates amplitudes of the modulated beat signal at a plurality of frequencies within a frequency band of the chirp signal when the phase shifter control word has the first value;
   performing a second measurement of the Rx channel and determining a second curve that illustrates the amplitudes of the modulated beat signal at the plurality of frequencies when the phase shifter control word has a second value, wherein the second measurement is performed using a same method as the first measurement but with the phase shifter control word having the second value; and
   for each frequency of the plurality of frequencies, generating a phase response curve using at least the amplitudes of the modulated beat signal in the first curve and the second curve that correspond to the each frequency, wherein the phase response curve illustrates phases of the Rx channel for different values of the phase shifter control word.

2. The method of claim 1, wherein a frequency of the chirp signal increases linearly over a period of time from a first frequency to a second frequency.

3. The method of claim 1, wherein the modulating signal has a plurality of values, wherein the modulated chirp signal comprises a scaled version of the chirp signal, wherein a scaling factor of the scaled version of the chirp signal is time-varying and changes in accordance with the value of the modulating signal.

4. The method of claim 3, wherein the modulated beat signal comprises a scaled version of the beat signal, when a scaling factor of the scaled version of the beat signal is time-varying and changes in accordance with the value of the modulating signal.

5. The method of claim 4, wherein the digital samples comprises first digital sample that are generated when the modulating signal has a first value, and comprises second digital samples that are generated when the modulating signal has a second value different from the first value, wherein the first digital samples comprise first segments of continuous data samples, and the second digital samples comprise second segments of continuous data samples, wherein the first segments are interleaved with the second segments.

6. The method of claim 5, wherein determining the first curve comprises, for each of the first segments:
determining a value of a last data sample in each of the first segments;
computing a difference between the value of the last data sample and a value of an adjacent data sample in the second segments;
converting a time location of the last data sample within the chirp signal into a frequency within the frequency band of the chirp signal; and
assigning the computed difference as the amplitude of the modulated beat signal at the converted frequency.

7. The method of claim 1, wherein generating the phase response curve comprises:
performing a curve fitting using at least the amplitudes of the modulated beat signal in the first curve and the second curve that correspond to the each frequency.

8. The method of claim 7, wherein the curve fitting is performed using a sine wave curve.

9. The method of claim 1, wherein a starting time of the chirp signal, a starting time of modulating signal, and a starting time of the ADC are synchronized.

10. A method of operating a frequency-modulated continuous-wave (FMCW) radar system having multiple receiving (Rx) channels, the method comprising:
calibrating the FMCW radar system, comprising:
setting the Rx channels in a calibration mode, wherein each of the Rx channels includes a mixer, a programmable phase shifter coupled to a first input terminal of the mixer, a filter coupled to an output terminal of the mixer, and an analog-to-digital converter (ADC) coupled to an output terminal of the filter;
sweeping a value of a phase shifter control word of the programmable phase shifter in each of the Rx channels across a range of values, wherein the value of the phase shifter control word sets a phase shift in the programmable phase shifter, wherein the sweeping comprises, for each of the Rx channels:
setting a value for the phase shifter control word of the programmable phase shifter;
sending a chirp signal to the programmable phase shifter;
sending a modulated chirp signal to a second input terminal of the mixer, wherein an output signal at the output terminal of the mixer comprises a beat signal; and
for each of the range of values of the phase shifter control word, forming an amplitude curve based on data samples from the ADC in the Rx channel, wherein the amplitude curve illustrates amplitudes of the beat signal at a plurality of frequencies within an operating frequency band of the FMCW radar system; and
after forming the amplitude curve, for each of the Rx channels and for each frequency of the plurality of frequencies, performing a curve fitting to generate a phase response curve using the amplitudes of the beat signal at the range of values of the phase shifter control word, wherein the phase response curve illustrates phases of the Rx channel for the range of values of the phase shifter control word.

11. The method of claim 10, wherein the modulated chirp signal comprises a scaled version of the chirp signal, wherein a scaling factor of the scaled version of the chirp signal is time-varying and changes in accordance with a value of a modulating signal, wherein the value of the modulating signal is time-varying.

12. The method of claim 11, wherein the data samples captured in each of the Rx channels for forming the amplitude curve includes:
first data samples captured when the modulating signal has a first value; and
second data samples captured immediately after the first data samples when the modulating signal has a second value,
wherein forming the amplitude curve comprises:
computing a difference between a last data sample of the first data samples and a first data sample of the second data samples;
converting a time stamp of the last data sample within the chirp signal into a frequency within the operating frequency band of the FMCW radar system; and
assigning the computed difference as the amplitude of the beat signal at the converted frequency.

13. The method of claim 10, wherein the curve fitting is performed using a sine wave curve.

14. The method of claim 10, further comprising, operating the FMCW radar system in a normal operation mode, comprising:
setting the Rx channels in a normal operation mode, wherein in the normal operation mode, a first input signal to the mixer in each of the Rx channels is a radio frequency (RF) signal from a respective receiving antenna, and a second input signal to the mixer in each of the Rx channels is an output of the programmable phase shifter, wherein the phase shifter control words of the programmable phase shifters in the Rx channels are set to different values.

15. The method of claim 14, wherein the different values for the phase shifter control words are chosen based on the phase response curves generated in the calibration mode.

16. The method of claim 14, wherein operating the FMCW radar system in the normal operation mode further comprises:

for each of the Rx channels, determining a phase value of the Rx channel for a respective phase shifter control word using the phase response curves for the Rx channel;

computing phase differences between the phase values of the Rx channels; and computing an angle of arrival of a radar target using the computed phase differences.

17. A frequency-modulated continuous-wave (FMCW) radar system comprising:

a plurality of receiving (Rx) channels, wherein each of the Rx channels comprises a mixer, a programmable phase shifter coupled to a first input terminal of the mixer, an filter coupled to an output terminal of the mixer, and an analog-to-digital converter (ADC) coupled to an output terminal of the filter; and a control logic coupled to the ADCs in the Rx channels, wherein the control logic is configured to calibrate each of the Rx channels by:

setting the Rx channel in a calibration mode;

generating a plurality of amplitude curves for the Rx channel, wherein each of the plurality of amplitude curves is generated by:

setting a phase shifter control word of the programmable phase shifter in the Rx channel to a different value;

sending a chirp signal to an input terminal of the programmable phase shifter;

sending a modulated chirp signal to a second input terminal of the mixer, wherein an output signal at the output terminal of the mixer comprises a beat signal; and computing, using data samples from the ADC in the Rx channel, amplitudes of the beat signal at a plurality of frequencies within an operating frequency band of the FMCW radar system; and after generating the plurality of amplitude curves, for each of the Rx channels and for each frequency of the plurality of frequencies, performing a sine wave curve fitting to generate a phase response curve using the amplitudes of the beat signals at the different values of the phase shifter control word, wherein the phase response curve illustrates phases of the Rx channel at different values of the phase shifter control word.

18. The FMCW radar system of claim 17, wherein the modulated chirp signal is the chirp signal modulated by a modulating signal, wherein the modulated chirp signal comprises a scaled version of the chirp signal, wherein a scaling factor of the scaled version of the chirp signal is time-varying and changes in accordance with a value of a modulating signal, wherein the value of the modulating signal is time-varying.

19. The FMCW radar system of claim 18, wherein an output signal at the output terminal of the filter comprises a scaled version of the beat signal, when a scaling factor of the scaled version of the beat signal is time-varying and changes in accordance with the value of the modulating signal.

20. The FMCW radar system of claim 17, wherein the control logic is further configured to:

set each of the Rx channels in a normal operation mode;

for each of the Rx channels, send a respective delayed chirp signal and a radio frequency (RF) signal from a respective receiving antenna to the first input terminal and the second input terminal of the mixer, respectively;

for each of the Rx channels, determine a phase value for the Rx channel for a respective phase shifter control word using the phase response curves for the Rx channel;

compute phase differences between the phase values of the Rx channels; and compute an angle of arrival of a radar target using the computed phase differences.

* * * * *